UNITED STATES PATENT OFFICE.

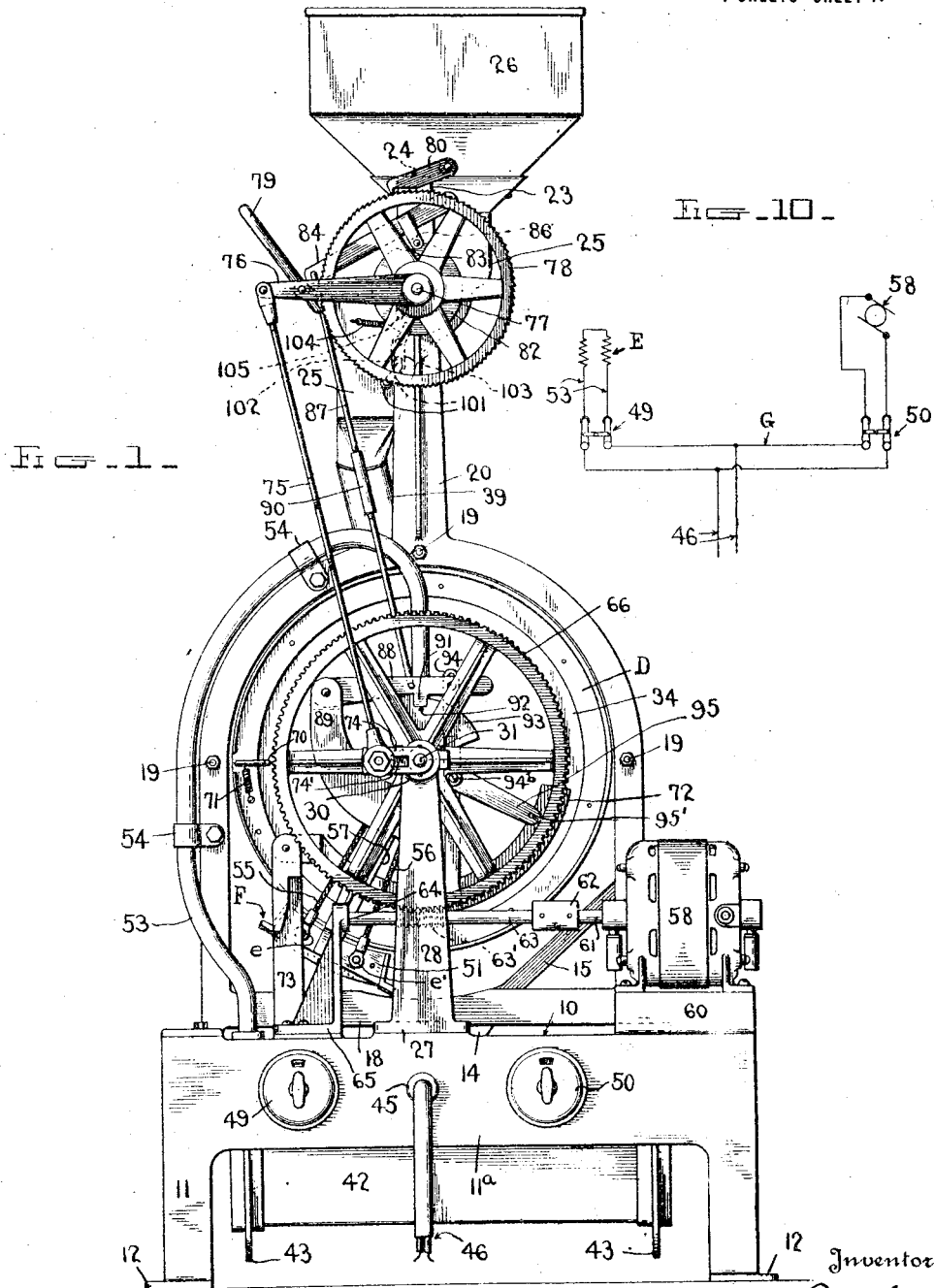

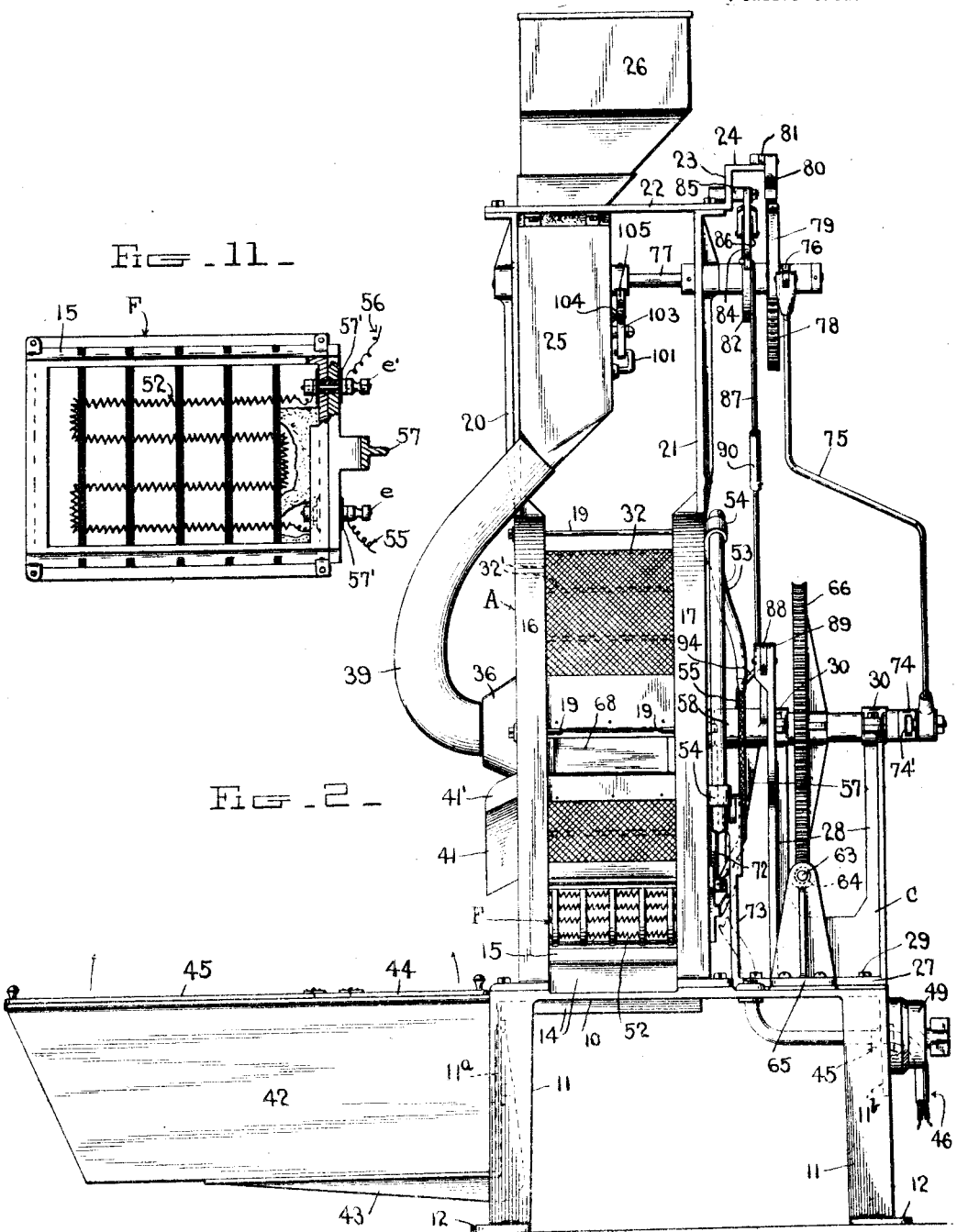

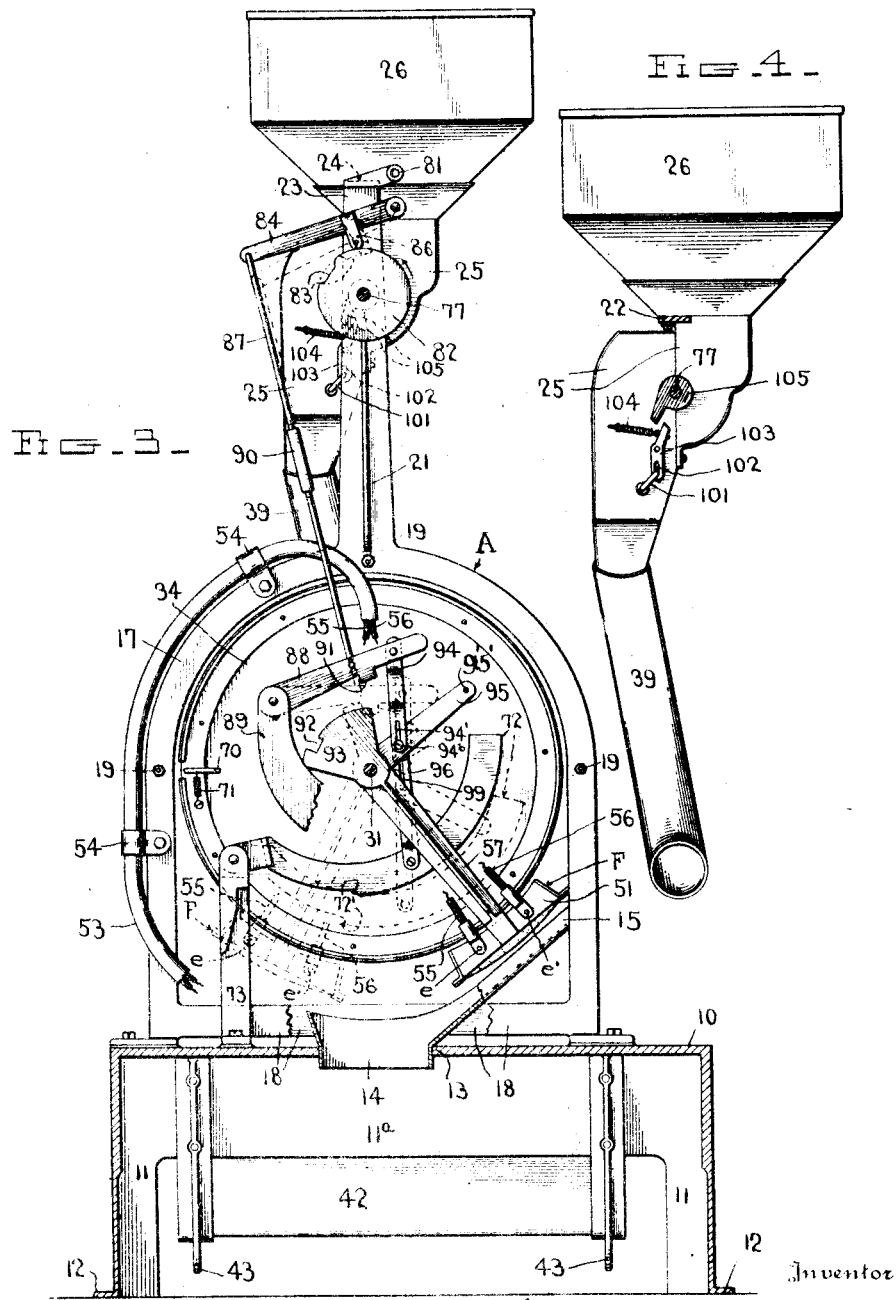

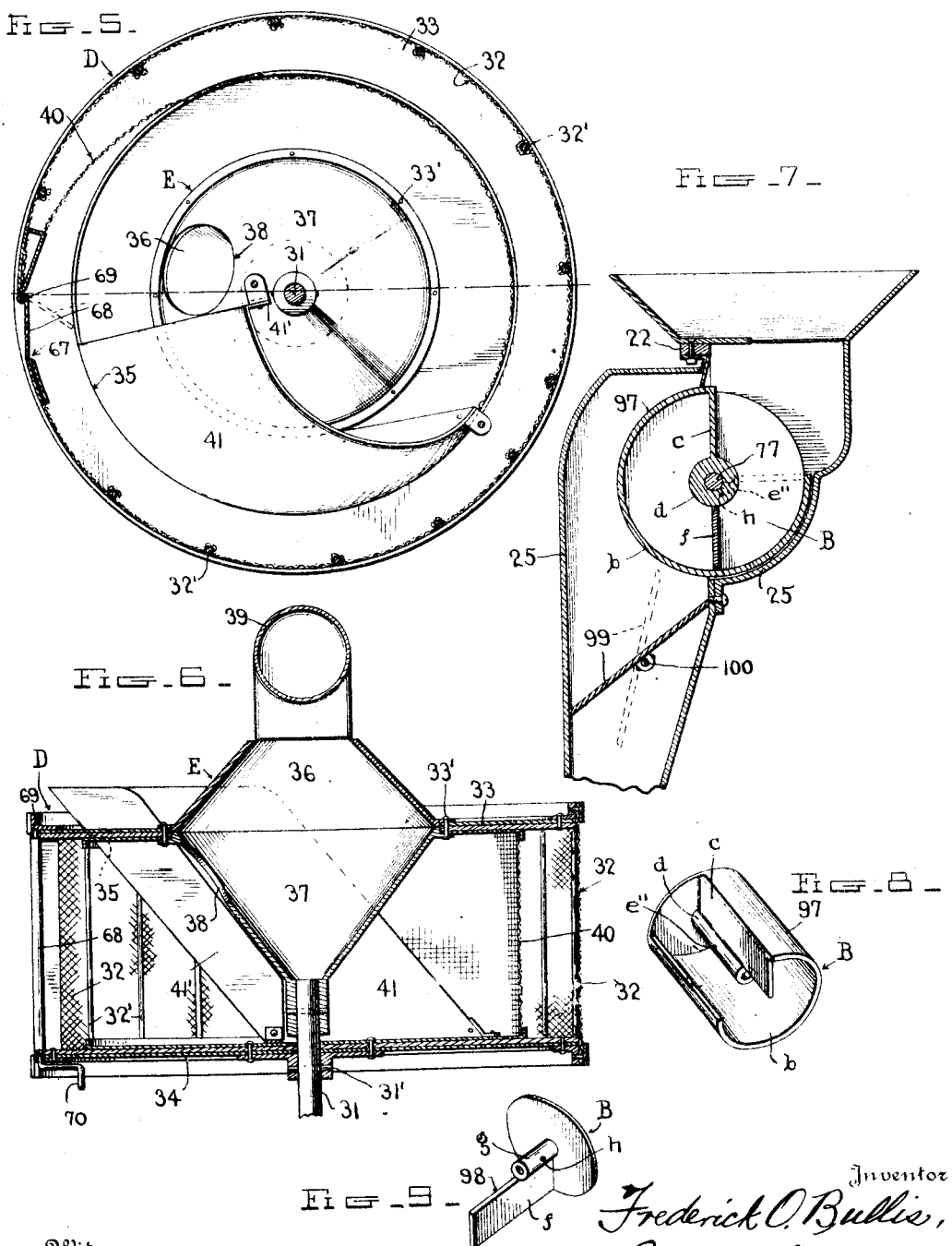

FREDERICK O. BULLIS, OF LOUISVILLE, KENTUCKY, ASSIGNOR TO LEKTRIC SALES COMPANY, OF LOUISVILLE, KENTUCKY, A CORPORATION OF KENTUCKY.

CORN-POPPING MACHINE.

1,182,075.  Specification of Letters Patent.  Patented May 9, 1916.

Application filed September 1, 1914. Serial No. 859,659.

*To all whom it may concern:*

Be it known that I, FREDERICK O. BULLIS, a citizen of the United States, residing at Louisville, in the county of Jefferson and State of Kentucky, have invented certain new and useful Improvements in Corn-Popping Machines, of which the following is a specification.

This invention relates to a machine for popping corn.

One object is to provide a machine for popping corn embodying among other characteristics means to effect popping of the corn and deliver the popped corn to the consumer or to a suitable receptacle in an economical and expeditious manner and in a highly sanitary condition.

Another object resides in the provision of a machine to pop corn embodying means to separate the popped from the unpopped corn and to discharge both from the popping means and later or at the time of discharging either the popped or unpopped corn or both feeding a quantity of corn to the popping means to be popped without danger of the popped, unpopped or freshly fed corn becoming mixed with one another.

Another object is to provide a machine of the nature stated embodying means whereby measured quantities of corn may be fed intermittently to a popping means to be popped whereby each batch of corn delivered to the popping means will be substantially the same in quantity with said measuring means and the mechanism which operates the same being adjustable so that the quantity of corn delivered to the popping means may be decreased or increased as desired.

A still further object resides in the provision of a continuously rotating popper drum which is preferably provided with a normally closed door with means associated with the popper drum to feed corn thereto intermittently and in which popper drum the corn may be popped by suitable heating means movable automatically into and out of heating position and held firmly both in operative and inoperative positions, there being means to effect the discharge of the popped corn and means to open and close said normally closed door to effect discharge of the unpopped corn from the popper drum during the continuous rotation of the latter.

It is still further designed to provide an electrically driven corn popping machine in which the corn is popped electrically and in which the corn is fed to the popping means automatically and automatically separated and discharged so that as the machine continues in operation an entirely fresh batch of corn may be popped, one after another, one batch not becoming mixed with another batch nor one batch becoming mixed with the popped or residue or unpopped corn of a preceding batch.

A still further object of the invention is to provide a continuous operating machine in which corn may be fed thereto simultaneously with the discharge of popped and unpopped corn without danger of the separate materials becoming mixed.

In addition to the above objects the present invention has for other aims the provision of a comparatively simple, economically operating, and inexpensive machine capable of popping corn efficiently and in a sanitary manner and which may be readily secured to and supported on a table, counter, or the like and when started operating automatically to perform its various functions of popping corn without the presence of an attendant.

With the above and other objects in view, the present invention consists in the combination and arrangement of parts hereinafter more fully described, illustrated in the accompanying drawings, and pointed out particularly in the appended claims, it being understood that changes may be made in size, proportions, and minor details so long as departure is not made from the scope of the appended claims and without sacrificing any of the advantages of the invention.

In the drawings: Figure 1 is an end elevation of the invention. Fig. 2 is a front elevation. Fig. 3 is a view partly in elevation and partly in vertical section, the dotted lines indicating the positions of various parts when the heating means is shifted to inoperative position. Fig. 4 is a detailed elevation of the hopper and the chute which leads to the popping means with the measuring device disposed between the hopper and the chute. Fig. 5 is a transverse sectional view through the popper drum. Fig. 6 is a transverse horizontal sectional view through the popper drum. Fig. 7 is a detailed fragmentary sectional view of the measuring device. Figs. 8 and 9 are detailed views illustrating the valve parts of the measuring device. Fig. 10 is a diagrammatic view of the electric circuit. Fig. 11 is a plan view of the electric heater, partly in section.

Referring now more particularly to the accompanying drawings, there is shown a base 10 which is mounted preferably on suitable legs 11 provided with feet 12 by which the base or other supporting means may be suitably and firmly positioned on a table, counter or other suitable support. Along opposite edges of the base, the legs are preferably connected by webs 11ᵃ and 11ᵇ.

The base is provided with an opening 13 in which may be disposed a flaring funnel 14, if desired, and which, if used, is preferably provided with an upwardly directed extension 15, for a purpose presently explained.

A frame A is preferably secured by means of bolts or other suitable fastenings to the base and which consists preferably of two opposite substantially U-shaped metallic or other members 16 and 17; the legs of each of which may be connected by webs or the like 18 and both of which members 16 and 17 may be held in spaced relation by means of suitable tie bolts or the like 19.

Upright arms 20 and 21 extend from the bight portions of the U-shaped frame members 16 and 17, respectively. These arms have their outer extremities preferably connected by a supporting strip 22 which preferably has one end directed upwardly, as at 23, and outwardly as at 24, preferably overhanging the U-shaped frame member 17.

A casing 25 is secured to the supporting strip 22, projecting upwardly and downwardly therefrom, the upwardly projecting portion of which is preferably flared to receive and support a suitable hopper 26. The lower projecting portion of this casing 25 forms a compartment for a measuring device B, hereinafter more fully described.

Mounted on the base is a standard C which consists preferably of a foot 27 and upright arms 28. Bolts 29 may be employed to secure this standard firmly on the base.

A rotatable shaft 31 is journaled in suitable bearings 30 at the upper extremities of said arms 28 of the standard C. This shaft 31 projects at one end into the frame A between the legs of the U-shaped frame member 17.

A popper-drum D is preferably keyed in any suitable manner to the inner end of said shaft 31 and its annular wall 32 is preferably composed of fine mesh wire or other suitable foraminated material, preferably braced by the agitator bars 32' which connect the sides 33 and 34 of the popper-drum, and which sides are preferably composed of suitable solid sheet material. A normally closed door 68 is provided in the annular wall of the popper-drum to effect discharge of unpopped corn as will be explained. The side 33 of the popper drum has an opening 35 to effect discharge of the popped corn.

A corn receptacle E is carried by the popper-drum. This receptacle consists preferably of a cone 36, which projects outwardly from the side 33 and whose major end communicates with the major end of another cone 37 which projects inwardly of the popper-drum. The minor end of the cone 37 embraces the popper-drum shaft 31 and is keyed to the inner end of the latter and it is by virtue of this connection between the cone 37 and the popper-drum shaft 31, and the key 31', that the popper-drum is firmly secured to the inner end of said shaft 31. The major ends of the cones 36 and 37 are secured together and to the side 33 by means of suitable fastenings 33'. The cone 37 has an opening 38 which permits the entrance of corn into the popper-drum by way of a chute 39 which leads from the lower end of the aforesaid measuring device casing 25 to the open minor end of the aforesaid cone 36 of the receptacle E.

The corn receptacle E is designed to receive the corn from the measuring device while the popper-drum is rotating, and by virtue of its construction and the location of the opening 38 in the cone part 37, the batch of measured corn is prevented from rushing directly into the popper-drum but effecting charging of the popper-drum at the proper time. For instance, it is preferred that the corn entering the receptacle E do so when the opening 38 is passed upwardly from its lowermost position so that the measured corn delivered to the receptacle remains therein until the opening 38 is revolved around to the opposite side of the shaft 3¹ and thereby reaches its proper discharging position when the corn will enter the rotating popper-drum.

A spiral separating member 40 is located within the popper drum. This separator is preferably composed of wire mesh or other foraminated material of larger gage than the mesh forming the foraminated annular wall of the popper-drum so as to permit the corn fed from the receptacle E to pass through the same to the annular wall of the popper-drum. This separating member 40 leads from a point adjacent the inner face of the annular wall of the popper-drum inwardly toward the aforesaid discharge opening in the side 33 of the popper-drum where it is secured in any suitable manner to a deflecting plate 41 which projects outwardly through the aforesaid discharge opening in the side 33 of the popper-drum.

The deflector plate 41 has an inclined wall 41' which is disposed preferably upon an incline corresponding with the inclination of that portion of the cone 37 which lies close to the free edge of said wall 41', as shown particularly in Fig. 6. This inclined wall 41' of the deflector plate acts as a bar to prevent the corn delivered to the popper-drum from said receptacle E from becoming mixed with the popped corn either at the time the latter is being discharged or at any other time. The result of this character of separating member and its arrangement within the popper-drum and its connection with said deflector plate 41 is that as the popper-drum rotates through the instrumentality of means hereinafter described the unpopped corn which has been delivered to the popper-drum by way of said receptacle E and which has passed through the foraminated separating member remains close to the lower portion of the foraminated annular wall of the popper-drum while the popped corn is taken up by the separator and gradually conveyed by the same and said deflector plate out through said discharge opening. Generally, if not always, according to adjustments, the opening 38 in the receptacle E is permitting charging of the popper-drum with corn at the time the popped corn is being discharged from the same. In other words, the opening 38 in the receptacle E, and the deflector plate 41, reach their lowermost or operative positions for discharging purposes at the same time, they performing their discharging functions substantially simultaneously.

A suitable receptacle 42 may be disposed along side of the machine or it may be firmly secured to suitable brackets 43 in turn secured in any suitable manner to the web 11ᵃ for the reception of the popped corn as it issues from the opening in the side 33 of the popper-drum. If desired this receptacle 42 may have a transparent or other hinged closure 44 which may be elevated to permit the entrance of the popped corn into the receptacle directly from the popper-drum and from which the popped corn may be taken by elevating the transparent or other door 45.

The corn may be popped in the popper-drum in any suitable manner, that is, by any suitable heating means, but I accomplish it preferably by electricity to insure, not only a sanitary popping of the corn, but an expeditious and an efficient popping with a minimum loss of material and heat units. To this end I preferably employ the electric heater F. The specific form of this heater may be varied. Suffice it to state the electric heater preferably consists of a rectangular frame 51 and suitable insulating elements and a heating coil 52 with the upper face of the heater preferably formed upon a curve to conform substantially with the curvature of the annular wall of the popper-drum under which the heater is mounted to swing.

The heater preferably lies very close to the foraminated annular wall of the popper-drum so as to supply the required amount of heat to the interior of the popper-drum through the foraminated wall thereof and so that the heat may come into direct contact with the corn to expedite the popping operation.

The electric heater may derive its heat from any suitable source, as for instance, city light supply (not shown) which may be connected up in any suitable manner with the circuit G. In the web 11ᵇ there may be provided an insulating hollow bushing 45 through which an extension 46 connected to an electric light supply circuit socket (not shown) may be passed and lead in any suitable manner to the electric heater E and to the motor 58 (hereinafter referred to) designed to drive the machine. Switches 49 and 50 are arranged in the circuit G so that current to either the heater or motor or both may be cut in or cut out by the manipulation of the switches, the switch 49 controlling the current to the heater and the switch 50 controlling the current to the motor. The electric circuit G is connected up with the electric heater preferably through the instrumentality of the conductor 53, which leads from the switch 49, and which may be supported on the frame member 17 by means of suitable holding devices 54 and it has branches 55 and 56 which connect with the heater preferably through the binding posts e and e'.

One way in which the electric heater may be mounted to swing is to provide an arm 57 which may be secured to the electric heater in any suitable manner, being insulated therefrom by suitable insulating material 57' and which arm is provided with a hub 58 journaled on the popper-drum shaft 31 between the aforesaid side 34 of the popper-drum and the standard C.

The electric motor which drives the machine may be of any suitable type and may be mounted in any suitable manner on the block or raised portion 60 of the base 10. Detachably coupled to the motor drive shaft 61, by means of a suitable coupling connection 62. is a worm shaft 63 which is journaled at its free end preferably in a suitable ball bearing 64 at the upper end of a suitable post 65 secured by means of bolts or otherwise to the base 10 and whose worm 63' is adapted to mesh with the worm gear 66 connected to the popper-drum shaft 31 and operating preferably between the arms 28 of the standard C. By operating the switch 50 the motor is set in operation. By virtue of the said operative connections between the motor and the popper-drum shaft 31, the latter is caused to rotate, and the popper-drum being secured to the popper-drum shaft, the drum continues to rotate slowly until the current is cut off and this may be accomplished by manipulation of said switch 50.

To effect discharge of the unpopped corn from the popper-drum during rotation of the latter and at the end of each operation of popping each measured quantity or batch of corn, I provide the peripheral wall of the popper-drum with a door opening 67 in which is mounted the aforesaid door 68. This door may be hinged in any suitable manner. It is illustrated as hinged by means of a suitable pintle 69 which may be journaled in the sides 33 and 34 of the popper-drum and which at the side 34 projects through the same outwardly in the form of a crank 70. The door is disclosed as opening inwardly and it is held normally closed in any suitable manner. One way in which to maintain the door normally closed is to provide a spring or the like 71 which has connection with said crank 70 and with the side 34 of the popper-drum. To open the door, the pintle must be rotated against the tension of this spring or the like 71. As the popper-drum rotates, this crank 70 normally passes under a curved trip arm 72 which is provided on its under side with a shoulder 72' and which is pivoted at one end to a post 73 and at its opposite end mounted for vertical up and down movement in a manner hereinafter described and which maintains the arm elevated at its free end so that the crank 70 of the door pintle may not engage the same during rotation of the popper-drum until the end of each popping operation, or until certain predetermined times, according to whether the corn is fed to the popper-drum intermittently or continuously. Where the corn is fed to the popper-drum intermittently the popper-drum shaft is provided with a crank arm 74 with which there may be connected an adjustable link 75 which has pivotal connection at its upper end with the free end of an oscillating arm 76 journaled at its inner end on a cam shaft 77 journaled in the arms 20 and 21 of the frame members 16 and 17 and which operates the aforesaid measuring device. The crank arm 74 has a slot 74' therein by means of which the link 75 may be adjustably connected thereto so as to provide for an adjustment in the step by step movement of the cam shaft which will now be explained.

The oscillating arm 76 is mounted adjacent a toothed wheel 78 which is keyed to said cam shaft 77. The arm carries a dog 79 adapted to engage the teeth of the toothed wheel 78 to rotate said cam shaft 77 step by step. For instance, as the popper-drum rotates the crank arm 74, the link connection 75 causes the oscillating arm 76 to oscillate up and down. On the down stroke of the oscillating arm, the dog 79 carried thereby being in engagement with the teeth of said toothed wheel 78 causes the latter and consequently the cam shaft 77, to be pushed or turned one step. On the up stroke of the oscillating arm 76 the dog 79 rides backwardly over the teeth of said gear wheel 78 and does not feed the wheel in either direction, until the crank arm 74 turns to such position as to pull downwardly on said link 75 when the oscillating arm and its dog again move downwardly causing the cam shaft to turn another step to the left and so on throughout the operation of the machine. A dog 80 carried by a lug 81 on the aforesaid upwardly projecting part 24 of the supporting strip 22 engages the teeth of the gear wheel 78 to prevent backward movement of the gear wheel and thereby insure an even and uniform feed of material from the measuring device to the receptacle E and consequently to the popper-drum, the adjustable connection between the crank arm 74 and the pitman or link 75 providing for an adjustment in the step by step feed of the cam shaft so that upon adjustment thereof, and proper regulation of the measuring device, the quantity of measured corn may be varied as desired.

A cam wheel 82 is secured on the cam shaft 77 adjacent said gear wheel 78 and it is provided with a recess 83. Coöperating with this cam wheel 82 is a lever 84 pivoted at one end to a lug 85 carried by the aforesaid upwardly directed part 23 of the supporting strip 22. This lever 84 carries spaced ears in which may be journaled a roller 86 adapted to ride over the periphery of said cam wheel and into and out of the recess 83. The outer end of this lever 84 is connected with an arm 88 by means of a link 87. The arm 88 is pivoted at one end to an arm 89 which projects from one of the uprights 28 of the standard C. The length of the link connection 87 is adjustable by virtue of an adjusting sleeve 90 and said link has its connection with the lever 88 preferably intermediate the ends of the latter.

The lever 88 carries a lug 91 adapted to engage in a notch 92 carried by a segmental shaped member 93 formed with or connected to the aforesaid hub 58 of the arm 57 which supports the electric heater F for the purpose of releasably locking the electric heater in its inoperative position when swung thereto. For instance, when the heater is in operative position the roller 86 rides over the periphery of the cam wheel 82 with the result that the link connection 87 holds the locking lever 88 in elevated position, as shown in Fig. 3, with the lug 91 of the locking lever to the right of the notch 92 in the segmental shaped member 93. When the recess 83 in the cam 82 has been fed, incident to the slow step by step feed of the cam shaft 77, in the manner hereinbefore described, until said recess 93 is brought to a position where the aforesaid roller 86 rides into the recess 83, the lever 84 under the weight of the various elements suspended thereby, consequently lowers, and the lug 91 carried by the locking arm 88 enters the notch 92 in the segmental member 93, thereby locking the electric heater in inoperative position.

There is a slotted link connection 94 between the locking lever 88 and a weight-arm 95 formed with or secured to the aforesaid hub 58. The slot 94′ in the link 94 slides on the stud 94ᵇ on the weight-arm 95 and the stud is near the upper end of said slot when said arms 88 and 95 are elevated so as to provide the necessary loose connection between said arms to permit ready operation thereof especially on their downward movements.

The weight-arm 95 is preferably cast in one piece with the arm 57, the hub 58, and the segmental shaped member 93, and has a normal tendency to swing all of these parts toward the left on its downward movement upon the release of the heater from operative position, that is, when the roller 86 of the oscillating lever 84 rides off of the periphery of the cam wheel 82 into said recess 83 of said cam wheel. It is the weight of this weight-arm which causes the aforesaid downward pull on said oscillating lever 84, and if desired, an auxiliary weight (not shown) may be secured in the eye 95′ of the weight arm 95 to insure ample weight and a consequent swinging of the parts to throw the heater to the left to its inoperative position. Thus as these parts are shifted under the influence of said weight arm, the electric heater is thrown to the left to inoperative position, and the segmental member 93, with its notch 92, is thrown to the right into the path of downward movement of the lug 91 on the arm 88 so that as the latter lowers in the manner stated the lug 91 engages in the notch 92 of the segment 93 and thereby releasably locks the electric heater in inoperative position where it remains during the interval in which said roller on said oscillating lever rides in said recess 83 in the cam wheel 82 and until said roller rides upwardly out of said recess under the influence of the step by step feed of said cam shaft 77 when the oscillating lever 84, will be pulled upon and raised. The upward movement of the oscillating lever 84 lifts the locking lever 88 upwardly, by reason of the link connection 87. On the upward movement of the locking lever 88 the lug 91 thereof is released from the notch 92 in the segmental member 93, and by virtue of the link connection 94 between the weight-arm 95 and the locking arm 88 the swinging arm 57, and consequently the electric heater, are all pulled or forced to operative position against the action of said weight-arm 95 and the heater thrown to operative position as shown in full lines in Fig. 3. It will thus be seen that the heater is held momentarily, as it were, in inoperative position, that is to say, the heater is held in inoperative position only during the interval when the roller 86 of the oscillating arm 76 is riding in said recess 83 in said cam wheel 82.

Connected to the weight-arm 95 is a slotted link 96 which has pivotal connection with the aforesaid curved trip arm 72. By virtue of the slot 99 in the link 96 the trip arm may have independent vertical pivotal movement. However, when the electric heater F is in operative position the trip bar 72 is in elevated position as shown in full lines in Fig. 3 so that its shoulder 72′ formed on its underside is out of the path of movement of the aforesaid crank 70 formed on the pintle 69 of the door 68 with the result that during the popping operation and while the popped corn is being discharged from the popper-drum the unpopped corn clings to that portion of the annular wall of the popper-drum slightly off to one side of that portion of the drum which is lowermost or thereabout and is not discharged with the popped corn or separately therefrom through said door opening 69 until the electric heater has been shifted to inoperative position as shown in dotted lines in Fig. 3. When the heater is released from operative position the weight-arm 95 lowers, as has already been stated, and as the trip-arm 72 is suspended from the weight-arm 95 by the said slotted link 96, it lowers with the weight-arm to the dotted line position shown in Fig. 3. The shoulder 72′ of the trip-arm 72 is then in the path of movement of said crank 70 with the result that the pintle, as the crank engages said shoulder 72′ is given a slight rotative movement which opens the door inwardly. As the crank 70 passes from the shoulder 72′, it rides over the lower curved edge of the lowered trip arm 72 from said shoulder 72′ to the outer or free extremity of the trip arm, when the door snaps to closed position under the action of said spring or the like 71. It is apparent, therefore, that the door 68 is open only during the interval of time when the door opening passes from the shoulder 72′ to the free extremity of the trip arm and only when the latter is in its lowermost position, and that, therefore, as the unpopped corn at all times clings to that portion of the annular wall of the popper-drum which is lowermost or practically there, and as the popped corn has been separated therefrom and discharged from the popper-drum, there is an efficient separation of the unpopped corn from the popped corn and an efficient discharge of the unpopped corn through the door opening 67. Before the door opening is closed the popper drum may be charged with the raw material. Until the door passes the free end of the trip-arm the latter holds the door 68 open as has been explained. The open door serves as a bar to prevent unpopped corn from sliding over the annular foraminated wall of the popper-drum backwardly beyond the door opening 67 with the result that the unpopped corn, which has a normal tendency to ride up the curved foraminated wall of the popper-drum as the latter rotates slides toward the lower portion of the popper-drum and is compelled by the open door to pass out through the door opening 67 in its backward sliding movement and fall through said door opening onto the aforesaid extension 15 of the funnel 14 in the opening 13 of the base 10 and through the funnel into any suitable receptacle (not shown) which may be located under the base 10, if desired. Just as the door 68 acts as a bar to compel the unpopped corn to pass through said door opening, it also coöperates with the wall 41' of the deflector plate 41 to serve as a bar to prevent the raw material fed to the popper-drum during discharge of the unpopped corn from passing through said door opening. In other words, the open door completely separates the unpopped corn of the previous operation from the raw material or corn supplied to the popper-drum for the next popping operation. The result is that the quantity of corn initially supplied to the popper-drum for the popping of each batch is uniform and one measured batch is not permitted to mix with the residue or unpopped corn of the preceding measured batch which has been treated to popping operation.

From the foregoing it will be apparent that there may be an intermittent feed of measured quantities or batches of corn to the popping means and that the popped corn and also the unpopped corn may be discharged separately from the popping means simultaneously, that is, that while popped corn is being discharged, the unpopped corn may also be discharged, and that raw material or another batch of corn may be supplied to the popping means during such discharge of the popped and unpopped corn without danger of mixture and a subsequent waste of material. Of course, there are times when popped corn is being discharged from the popping means and unpopped corn is not being discharged therefrom, but at the completion of the popping operation on each batch of material the unpopped corn is discharged at a time when the last portion of the popped corn is being discharged.

The measuring device hereinbefore referred to is preferably in the form of a valved device. Valve parts 97 and 98 are both keyed on the aforesaid cam shaft 77 within the aforesaid casing 25. The valve part 97 includes a body portion $b$ and a web portion $c$ and a hub $d$ which is provided with an aperture $e''$ whereby it may be keyed to the cam shaft 77. The valve part 98 may include a web $f$ the hub $g$ provided with an aperture $h$ by which it may be keyed to the cam shaft 77 in such a way that the webs $c$ and $f$ of these valve parts may coöperate to form a pocket to take the corn from the hopper 26 and the upper portion of the casing 25 to the lower portion of the casing 25 on the underside of said valve and deposit the measured quantity or batch of corn on the valve 99 located below the aforesaid valve.

The valve 99 is pivoted or secured to a shaft 100 which is journaled in the casing 25. One end of this shaft 100 projects through the casing 25 and is provided with a crank arm 101 which has connection in a slot 102 formed in a dog 103 pivoted on the outer side of the casing 25. This dog 103 is held normally in the position shown in Fig. 4 by a spring 104 secured to the dog and to the casing 25. At the proper time, under the influence of the aforesaid step by step rotation of the cam shaft 77, a cam 105 fixed on the cam shaft 77 engages the dog 103 and moves the same on its pivot against the action of said spring 104 and consequently tilts the valve 99 from the full line position to the dotted line position shown in Fig. 7, effecting a discharge of the measured batch of corn into the chute 39 for deposit into the popper-drum by way of the aforesaid receptacle E. The casing 25 is preferably formed in two parts as shown and it will be understood that the specific type of measuring device may be varied but is preferably of a type or structure whereby the measured quantity or batch of material may be varied.

In view of the foregoing description, it is believed that detailed statements of operation are unnecessary. The operation of the machine, briefly stated, is that the machine operates very slowly and that corn is placed in the hopper 26 from which it is taken in measured quantities by the measuring device B and subsequently delivered by way of the chute 39 to the receptacle E which is carried by the popper-drum and from which it is fed into said drum by way of the opening 38 in the receptacle E, and in which drum, incident to the continuous rotation of the same under the influence of the electric motor 58, the corn is agitated by reason of its sliding movement in mass form on the annular wall of the popper-drum and over the agitating elements 32' as the latter successively pass under the mass of material. The continuous rotation of the popper-drum has a tendency to lift the mass of corn upwardly and when the mass reaches a certain point in its upward movement it necessarily falls by gravity toward the lower portion of the popper-drum. This movement of the corn insures a thorough agitation of the same and causes the batch of corn to be maintained slightly off to one side of the axis of the popper-drum directly over the electric heater F which, as clearly shown in Fig. 3 is disposed to the right of the axis 31 of the popper-drum. The popped corn is gradually separated from the unpopped corn by the separator 40 and it is discharged by the deflector 41 from the popper drum. When the measured batch of corn has been popped and discharged and which is accomplished within a predetermined time, the electric heater is temporarily swung from a heating position shown in full lines in Fig. 3 to its inoperative position shown in dotted lines in Fig. 3 and the door 68 is opened by the trip arm 72 to permit of the discharge of the unpopped corn and to prevent mixing of the unpopped corn of a preceding batch with the corn of a succeeding batch which may be fed to the popper-drum at the time of the discharge of the unpopped corn from the drum. During this discharge of the unpopped corn and the charging of the popper-drum with corn to be popped, the popped corn of the preceding batch or a portion thereof may be passing out by way of said deflector 41 to the consumer or to the receptacle 42, if used. In any event, at a predetermined time, the door 68 automatically closes and the electric heater is automatically returned to heating position by the cam wheel 82 in its coöperation with the oscillating arm 84 and the connections between the cam wheel 82, the oscillating arm 84 and the heater which connections serve to hold the heater in heating position and which connections serve to effect the locking of the heater in its inoperative position. With the exception of turning on the current to the motor and to the heating means, all of these operations are automatic, positive and properly timed for best results whether the corn be fed to the popper-drum during discharge of the popped and unpopped corn or either of them or at a time after the separated popped and unpopped corn are discharged from the popper-drum.

What is claimed is:

1. In a machine of the character described, a continuously rotatable popper-drum provided with a normally closed door, means to rotate the popper-drum, means to intermittently feed corn to the popper-drum, a swinging heater to pop the corn, means automatically operable by the feeding means to hold the heater in operative position and to release the heater to permit the same to swing to inoperative position, means operable at the limit of the swing of the heater to inoperative position to lock it against accidental return to operative position, means operable by the feeding means to release said locking means and to swing the heater to and hold it in operative position, means to open said door while the heater is in inoperative position to discharge the unpopped corn from the popper through said door, and means to close said door prior to swinging movement of the heater to operative position.

2. In a machine of the character described, a base provided with an opening, a rotatable popper-drum mounted over said opening, means to rotate the popper-drum, means to feed corn to the popper-drum, movable means beneath the popper-drum to heat the corn in the drum to pop the same, means to separate the popped corn from the unpopped corn, means to discharge the popped corn from the popper-drum during rotations of the latter, means to discharge the unpopped corn from the popper-drum during rotation of the same, and means to move the heating means across said opening prior to the discharge of the unpopped corn from the popper-drum.

3. In a machine of the character described, a rotatable popper-drum, means for rotating the popper-drum, means to feed corn to the popper-drum, and heating means mounted beneath the popper-drum to swing in a plane at a direct right angle to the axis of the popper drum and adapted to pop the corn in the popper-drum when at one limit of its swinging movement.

4. In a machine of the character described, a rotatable popper-drum, means for rotating the popper-drum, means to feed corn to the popper-drum, heating means movably mounted beneath the popper-drum to pop the corn, means to hold the heating means in operative position and to release same to permit the heating means to move to inoperative position, means operative at the limit of the movement of the heating means to inoperative position to lock the heating means against accidental return to operative position, means to release said locking means and to move the heater to and hold it in operative position, means to discharge the popped corn from the popper-drum, and means to discharge the unpopped corn therefrom.

5. In a corn popping machine, a continuously slow rotating popper-drum, a swingingly mounted heating means, means to swing the heating means at predetermined times, means to discharge the popped corn from the popper-drum, and means to discharge the unpopped corn between swinging movements of the heating means.

6. In a corn popping machine, a rotatable popper drum whose annular wall is foraminated, and an electric heater mounted to swing in a plane at a direct right angle to the axis of the popper drum from one side to the other side of the annular wall of the popper drum.

7. In a corn popping machine, a rotatable popper drum whose annular wall is foraminated, and an electric heater spaced from and mounted to swing in a plane at a right angle to the axis of the popper drum beneath the latter into and out of operative position.

8. In an electric corn popping machine, a rotatable popper drum, an electric heater spaced from and mounted to swing in a plane at a direct angle to the axis of the popper drum beneath the latter into and out of operative position, and means to rotate the popper drum slowly.

9. In a corn popping machine a continuously rotating popper-drum whose annular wall is provided with an inwardly opening normally closed door and which has an inlet and a discharge opening in one side, an electric motor to rotate the popper-drum, means to conduct the corn to the popper-drum through said inlet, an electric heater to pop the corn, and means to automatically open said door to discharge the unpopped corn from the popper-drum at each revolution of the same.

10. In a machine of the character described, a rotatable popper-drum, means to rotate the same, means to feed corn to the popper-drum, a swinging heater to effect popping of the corn, means operable to hold the heater in operative position and also to effect a release of the heater to permit the same to swing to inoperative position, means operable at the limit of the swinging movement of the heater to inoperative position, to lock it against accidental return to operative position, means to automatically release said locking means at a predetermined time and to swing the heater to operative position, means to separate the popped from the unpopped corn, means to discharge the unpopped corn from the popper-drum, and means to discharge the popped corn therefrom.

11. In a machine of the character described, a rotatable popper-drum, whose annular wall is foraminated and which has one end provided with an inlet and a discharge opening, an electric heater arranged to swing beneath the popper-drum in a plane at a direct right angle to the axis of the popper-drum to effect popping of the corn, means within the popper-drum to separate the popped from the unpopped corn and to discharge the popped corn through said discharge opening at each revolution of the popper-drum.

12. In a machine of the character described, a rotatable popper drum whose annular wall is foraminated, an electric heater movably mounted adjacent the popper drum, a normally closed door in the annular wall of the drum, means to move the heater from operative to inoperative position, means operable after said movement of said heater to trip and open said door, and means to return the heater to operative position after the closing of said door.

13. In a machine of the character described, a rotatable popper-drum, a corn receiving receptacle carried by the popper-drum and having communication with the latter, a hopper arranged above the popper-drum, a chute between the hopper and the receiving receptacle of the popper-drum, a measuring device in the line of the chute to charge said receptacle with successive measured batches of corn for subsequent discharge into the popper-drum, means to rotate the popper-drum, and an electric heater spaced from the popper drum to heat the corn in the popper-drum to pop the same.

14. In a machine of the character described, a rotatable popper-drum, a corn receiving receptacle carried by the popper-drum and having communication with the latter, a hopper arranged above the popper-drum, a chute between the hopper and the receiving receptacle of the popper-drum, a measuring device in the line of the chute to charge said receptacle with successive measured batches of corn for subsequent discharge into the popper-drum, means to rotate the popper-drum, means to heat the corn to pop the same in the popper-drum, means to separate the popped corn from the unpopped corn, means to discharge the popped corn from the popper-drum, and means to discharge the unpopped corn from the popper-drum.

15. In a machine of the character described, a rotatable popper-drum, a corn receiving receptacle carried by the popper-drum and having communication with the latter, a hopper arranged above the popper-drum, a chute between the hopper and the receiving receptacle of the popper-drum, a measuring device in the line of the chute to charge said receptacle with successive measured batches of corn for subsequent discharge into the popper-drum, means to rotate the popper-drum, an electric heater swingingly mounted beneath the popper-drum, and means for swinging the heater.

16. In a machine of the character described, a base having an opening therein, a popping means mounted over the base, means for feeding measured quantities of corn to the popping means to be popped, means for discharging the popped corn from the popping means, a receptacle disposed adjacent the popping means to receive the popped corn, and means to discharge the unpopped corn from the popping means through said opening in the base.

17. In a machine of the character described, a continuously rotating cylindrical popper-drum, a receptacle carried by the popper-drum and rotatable therewith and provided with an opening which communicates with the interior of the popper-drum, a measuring device to supply measured quantities of corn to said receptacle intermittently and alternately with relation to discharge of measured batches of corn discharged from said receptacle into the popper-drum and a heating means to pop the corn.

18. In a machine of the character described, a continuously rotating cylindrical popper-drum, a receptacle carried by the popper-drum and rotatable therewith and provided with an opening which communicates with the interior of the popper-drum, a measuring device to supply measured quantities of corn to said receptacle intermittently and alternately with relation to discharge of measured batches of corn discharged from said receptacle into the popper-drum, a heating means to pop the corn, and means to discharge the popped corn from the popper-drum.

19. In a machine of the character described, a continuously rotating cylindrical popper-drum, a receptacle carried by the popper-drum and rotatable therewith and provided with an opening which communicates with the interior of the popper-drum, a measuring device to supply measured quantities of corn to said receptacle intermittently and alternately with relation to discharge of measured batches of corn discharged from said receptacle into the popper-drum, a heating means to pop the corn, means to separate the popped from the unpopped corn and to discharge the popped corn from the popper-drum, and means to discharge the unpopped corn from the popper-drum.

20. In a machine of the character described, a continuously rotating cylindrical popper-drum, a receptacle carried by the popper-drum and rotatable therewith and provided with an opening which communicates with the interior of the popper-drum, a measuring device to supply measured quantities of corn to said receptacle intermittently and alternately with relation to discharge of measured batches of corn discharged from said receptacle into the popper-drum, a heating means to pop the corn, means to separate the popped from the unpopped corn and to discharge the popped corn from the popper-drum, and means to discharge the unpopped corn from the popper-drum at the time of discharge of another measured batch of corn into the popper-drum from said receptacle.

21. In a machine of the character described, a continuously rotatable popper drum provided with a normally closed door, means to rotate the popper-drum, means to intermittently feed corn to the popper drum, a swinging heater to pop the corn, means automatically operable by the feeding means to hold the heater in operative position and to release the heater to permit the same to swing to inoperative position, means operable at the limit of the swing of the heater to inoperative position to lock it against accidental return to operative position, means to release said locking means and to swing the heater to and hold the same in operative position, and means set in operation by the means which swings the heater to inoperative position to open said door subsequent to the movement of the heater to inoperative position, and means to close said door prior to swinging movement of the heater to operative position.

22. In a machine of the character described, a continuously rotating popper drum provided with a normally closed door, means to rotate the popper drum, means to feed corn to the popper drum, a movable heater to pop the corn, means automatically operable by the feeding means to hold the heater in operative position and to release the same to permit it to swing to inoperative position, and means positioned for operation to open said door after the heater is moved to inoperative position so as to discharge the unpopped corn from the popper drum through said door.

23. In a machine of the character described, a continuously rotating popper drum provided with a normally closed door, means to rotate the popper drum, means to feed corn to the popper drum, a movable heater to pop the corn, means automatically operable by the feeding means to hold the heater in operative position and to release the same to permit it to swing to inoperative position, means positioned for operation to open said door after the heater is moved to inoperative position so as to discharge the unpopped corn from the popper drum through said door, and means for automatically returning the heater to operative position.

24. In a pop corn machine, a popper-drum mounted to rotate on a horizontal axis and whose annular wall is foraminated and provided with an opening, a normally closed door for said opening, means to automatically open said door, an electric heater movably mounted beneath said door, means to move the heater to inoperative position prior to the opening of said door, and means to move the heater to operative position when the door is closed.

25. In a pop corn machine, a popper drum mounted to rotate on a horizontal axis and whose annular wall is composed of foraminated material, means to rotate the popper drum, and a heater suspended from the axis of the popper drum and arranged beneath the latter to supply heat thereto through the foraminated wall thereof during rotation of the drum to pop the corn.

26. In a corn popping machine, a rotatable popper-drum provided with an opening in its annular wall, a normally closed door for said opening, means to feed corn in measured batches to the popper-drum, one batch after another, means to pop the corn in the popper-drum, means to separate the popped from the unpopped corn of each batch, means to open said door to prevent mixture of the corn of a succeeding batch with the unpopped corn of a preceding batch and to effect discharge of the latter corn, and means to close the door after the discharge of the unpopped corn of each batch.

27. In a corn popping machine, a rotatable popper-drum provided with an opening in its annular wall, a normally closed door for said opening, means to feed corn in measured batches to the popper-drum, one batch after another, means to pop the corn in the popper-drum, means to separate the popped from the unpopped corn of each batch, means to open said door to prevent mixture of the corn of a succeeding batch with the unpopped corn of a preceding batch and to effect discharge of the unpopped corn, means to discharge the popped corn from the popper-drum during the feed of a succeeding batch of corn to the popper drum and during the discharge of unpopped corn from the popper-drum, and means coöperating with the door when opened to prevent mixing of the corn of the succeeding batch with the unpopped corn of the preceding batch.

28. In a machine of the character described, a popper drum whose annular wall is foraminated, an electric heating means movably mounted adjacent the popper drum, means to intermittently feed corn to the popper drum, and means automatically operable by the feeding means to move the heating means with relation to the popper drum.

29. A corn popper-drum comprising side walls, one of which has a discharge opening, a shaft extending through the opposite side of the popper-drum and terminating short of the discharge side thereof, a receptacle secured to the discharge side of the popper-drum and projecting into the latter and secured to the shaft and communicating with the popper-drum, said receptacle also projecting outwardly from the popper-drum and having an inlet.

30. A corn popper-drum comprising side walls, one of which has a discharge opening, a shaft extending through the opposite side of the popper-drum and terminating short of the discharge side thereof, a receptacle secured to the discharge side of the popper-drum and projecting into the latter and secured to the shaft and communicating with the popper-drum, said receptacle also projecting outwardly from the popper-drum and having an inlet, a door opening formed in the annular wall of the drum, a door for said opening, means for maintaining the door normally closed, and means for opening the door.

31. A corn popper-drum comprising side walls, one of which has a discharge opening, a shaft extending through the opposite side of the popper-drum and terminating short of the discharge side thereof, a receptacle secured to the discharge side of the popper-drum and projecting into the latter and secured to the shaft and communicating with the popper-drum, said receptacle also projecting outwardly from the popper-drum and having an inlet, means to feed corn to said receptacle for discharge into the popper-drum through said opening in the receptacle, a heater supported from the shaft and located beneath the popper-drum, a spiral separator located within the popper-drum to separate the popped from the unpopped corn, the popped corn being discharged through said discharge opening in the side of the popper-drum, and means to discharge the unpopped corn separated from the popped corn.

32. A corn popper-drum comprising side walls, one of which has a discharge opening, a shaft extending through the opposite side of the popper-drum and terminating short of the discharge side thereof, a receptacle secured to the discharge side of the popper-drum and projecting into the latter and secured to the shaft and communicating with the popper-drum, said receptacle also projecting outwardly from the popper-drum and having an inlet, means to feed corn to said receptacle for discharge into the popper-drum through said opening in the receptacle, a heater supported from the shaft and located beneath the popper drum, a spiral separator located within the popper-drum to separate the popped corn from the unpopped corn, the popped corn being discharged through said discharge opening in the side of popper-drum, a normally closed door for the popper-drum, and means to automatically open said door to discharge the unpopped corn from the popper-drum.

33. In a corn popping machine, a continuous slowly rotating popper drum provided with an inlet, means to feed a batch of corn through the inlet to the popper-drum, the batch of corn due to the rotation of the popper-drum sliding in the drum over substantially the same area of space and slightly to one side of the axis of the drum until popped, and an electric heater disposed slightly to one side of the axis of the drum directly under the area of space over which the batch of unpopped corn slides in the popper-drum so as to effect popping of the corn.

34. In a corn popping machine, a continuous slowly rotating popper-drum, means to feed a batch of corn to the popper-drum, the batch of corn incident to the rotation of the popper-drum sliding therein over a restricted area slightly off to one side of the axis of the popper drum until popped, an electric heater located under the popper-drum directly under the area over which the unpopped corn slides to pop the corn, means to shift the heater to the opposite side of the popper drum and means to discharge the popped corn from the popper-drum.

35. In a corn popping machine, a continuous, slowly rotating popper-drum, means to feed a batch of corn thereto, the batch of corn incident to the rotation of the popper-drum sliding therein over a restricted area slightly off to one side of the axis of the popper-drum until popped, an electric heater to pop the corn, means to shift the heater to the opposite side of the popper drum, means to discharge the popped corn from the popper-drum, and means to discharge the unpopped corn from the popper-drum.

36. In a corn popping machine, a continuous, slowly rotating cylindrical popper-drum, means to feed corn thereto, and an electric heater bodily movable adjacent the popper-drum to heat and pop the corn in the drum, the inner face of the electric heater being formed upon the arc of a circle conforming to the curvature of the annular wall of the cylindrical popper-drum and lying close to the latter to effect popping of the corn.

37. In a corn popping machine, a continuous, slowly rotating cylindrical popper-drum, means to feed corn thereto, an electric heater bodily movable adjacent the popper-drum to heat and pop the corn in the popper-drum, the inner face of the electric heater being formed upon an arc of a circle conforming to the curvature of the annular wall of the popper-drum, means to move the heater from one side of the annular wall of the drum to the other side thereof, means to separate the popped from the unpopped corn and discharge the same from the popper-drum, and means to discharge the unpopped corn from the popper-drum.

38. In a corn popping machine, a rotatable cylindrical popper-drum, means to feed a measured batch of corn thereto, a swingingly mounted electric heater located beneath the popper-drum directly under the measured batch of corn to pop the same, the inner face of the electric heater being formed upon the arc of a circle conforming to the curvature of the annular wall of the cylindrical popper-drum, and lying close thereto, and means to swing the heater from one side of the annular wall of the drum to the other side of the annular wall thereof.

39. In a corn popping machine, a rotatable cylindrical popper-drum, means to feed a measured batch of corn thereto, and a heater swingingly suspended from the axis of the popper drum and located beneath the popper-drum directly under the measured batch of corn to pop the same, the inner face of the heater being formed upon the arc of a circle conforming to the curvature of the annular wall of the cylindrical popper-drum, and means to swing the heater bodily from one side of the annular wall of the popper drum to the other side of said annular wall of the popper drum.

40. In a corn popping machine, a rotatable cylindrical drum, the drum having a normally closed discharge opening, means to feed a batch of corn to the drum, an electric heater bodily movable beneath the drum and having its inner face formed upon the arc of a circle conforming to the curvature of the annular wall of the drum and lying close thereto, means to discharge the popped corn, means to move the heater and means to automatically operate said normally closed opening in the drum to discharge the unpopped corn from the drum during the intervals between movements of the heater.

41. In a corn popping machine, a rotatable cylindrical popper-drum whose annular wall is foraminated and which is provided with an inlet in one side, means to feed a batch of corn to the popper-drum through said inlet, bars connecting the sides of the popper-drum to support the foraminated annular wall of the popper drum and to form spaced corn agitators, the batch of corn due to the rotation of the popper-drum sliding on the foraminated wall of the popper-drum within a restricted area and off to one side of the axis of the popper-drum, and an electric heater beneath the drum off to one side of the axis thereof and directly beneath the batch of unpopped corn to pop the same.

42. In a corn popping machine, a rotatable cylindrical popper-drum whose annular wall is foraminated and which has one side provided with an inlet, means to feed a batch of corn through said inlet into the popper-drum, bars connecting the sides of the popper-drum to brace the annular wall of the popper-drum and to agitate the corn during rotation of the popper-drum, the corn, due to the rotation of the popper-drum sliding on the annular wall thereof slightly off to one side of the axis of the drum, a heater located beneath the popper-drum slightly off to the side of the axis of the popper-drum and directly beneath the batch of unpopped corn to pop the same, means to discharge the popped corn from the popper-drum, and means to discharge the unpopped corn from the popper-drum.

43. In a corn popping machine, a base, a standard on the base, a shaft journaled on the standard, a frame on the base, a popper-drum located within said frame and secured to said shaft for rotation therewith, means to rotate said shaft, a cam shaft journaled in said frame, an operative connection between shafts to operate the latter, a cam wheel secured on the cam shaft and having a recess in its periphery, an oscillating arm secured to said frame and carrying a roller to ride on the periphery of the cam wheel and into and out of said recess, a swinging arm journaled on the popper-drum shaft, a heater suspended by said swinging arm under the popper-drum, a segmental shaped member projecting from the journal of said swinging arm and provided with a notch, a locking arm pivoted to said standard and provided with a lug, a connection between the oscillating arm and the locking arm, a weight projecting from the journal of the swinging arm, and a connection between the weight and the locking arm whereby when said roller on the oscillating arm rides on the periphery of said cam wheel on opposite sides of said recess the heater carried by said swinging arm will be held in operative position to one side of the popper-drum shaft to pop the corn and when the roller rides into said recess of the cam wheel the weight will lower and thereby rotate the journal of the swinging arm which carries the heater and throw said heater and its arm to the opposite side of the popper-drum shaft and cause the locking arm to lower and dispose its lug in said notch of said segmental member and thereby lock the heater in its inoperative position against accidental return to operative position on the opposite side of the popper-drum shaft, and means to fed corn to the popper-drum.

44. In a corn popping machine, a base provided with an opening, a standard on the base, a shaft journaled on the standard, a frame on the base, a popper-drum secured to said shaft and having a normally closed door on its annular wall, means to rotate said shaft and consequently the popper-drum, a cam shaft journaled in the aforesaid frame, a cam wheel fixedly secured to the cam shaft and in its periphery having a recess, an oscillating arm secured to said frame and carrying a roller to ride on the periphery of the cam wheel and into and out of said recess of the cam wheel, a toothed wheel on the cam shaft, means between the popper-drum shaft and the toothed wheel on the cam shaft to feed the latter step by step, a swinging arm journaled on the popper-drum shaft, a heater suspended by the swinging arm under the popper-drum, a segmental member projecting from the journal of said swinging arm and provided with a notch, a locking arm pivoted to said standard and provided with a lug, a connection between the oscillating arm and the locking arm, a weight projecting from the journal of the swinging arm, a connection between the weight and the locking arm whereby when said roller on the oscillating arm rides on the periphery of said cam wheel the heater carried by said swinging arm is held in operative position to one side of the popper-drum shaft and when the roller rides into said recess of the cam wheel said weight lowers and thereby rotates the journal of the swinging arm and throws the heater to inoperative position on the opposite side of the popper-drum shaft when the lug on the locking arm engages in said notch of the segmental shaped member and locks the heater in its inoperative position against accidental return to operative position until said roller rides out of the recess of said cam wheel and lifts said locking lever and forces the heater against the action of said weight back to operative position, and a trip arm mounted on the base and connected to said weight and movable to operative position when the heater is swung to inoperative position to operate said normally closed door to discharge the unpopped corn from the popper-drum and through said opening in the base.

45. In a corn popping machine, a base, a shaft journaled on the base, a popper-drum secured to said shaft, means to rotate the shaft, means to feed corn to the popper-drum, a swinging arm journaled on the popper-drum shaft, a heater secured to said arm and located beneath the popper-drum normally to one side of the shaft, means to automatically swing said arm and shift the heater to the opposite side of said shaft, means to automatically releasably lock the swinging arm and heater on said opposite side of the shaft, means to discharge the popped corn from the popper-drum, and means to discharge the unpopped corn from the popper-drum when said swinging arm and heater are swung to said opposite side of the popper-drum shaft.

46. In a corn popping machine, a base, a shaft journaled on the base, a popper-drum secured to said shaft, means to rotate the shaft, means to feed corn to the popper-drum, a heater swingingly mounted beneath the popper-drum and located in heating position normally to one side of the popper drum shaft, means to automatically swing the heater to inoperative heating position on the opposite side of said shaft, means to automatically releasably lock the heater on said opposite side of the shaft against accidental return to operative heating position and to operate said locking means at a predetermined time, means to then return the heater to normal operative heating position, means to discharge the popped corn from the popper drum, and means to discharge the unpopped corn from the popper drum when the heater is swung to said inoperative position.

47. In a corn popping machine, a popping means, including a swingingly mounted heater, means to feed corn to the popping means, means to discharge the popped corn from the popping means, means to swing the heater temporarily to inoperative position, and means to discharge the unpopped corn from the popping means when the heater is swung to temporary inoperative position.

48. In a corn popping machine, a popping means, including a movable heater, means to feed corn to the popping means to be popped, means to discharge the popped corn from the popping means, means to move the heater temporarily to inoperative position, and means to discharge the unpopped corn from the popping means while the heater is temporarily in inoperative position, and means whereby the heater may be returned to operative position.

49. In a machine of the character described, a popper drum, means to feed the corn to the drum, heating means movably mounted with relation to the popper drum to pop the corn, means to support the heating means in operative position and to automatically release same to permit the heating means to move to inoperative position, means operative at the limit of the movement of the heating means to inoperative position to lock the same against accidental return to operative position, means to release said locking means and to move the heating means to and hold it in operative position, means to discharge the popped corn from the popper drum, and means to discharge the unpopped corn therefrom.

In testimony whereof I affix my signature in presence of two witnesses.

FREDERICK O. BULLIS.

Witnesses:
THOMAS J. COMER,
CHARLES L. STEPHENS.